United States Patent [19]

Tsujimoto

[11] Patent Number: 4,846,855

[45] Date of Patent: Jul. 11, 1989

[54] METHOD FOR ADSORPTION TREATMENT OF GAS

[75] Inventor: Soichiro Tsujimoto, Ohtsu, Japan

[73] Assignee: Toyo Boseki Kabushiki Kaisha, Osaka, Japan

[21] Appl. No.: 172,887

[22] Filed: Mar. 25, 1988

[30] Foreign Application Priority Data

Mar. 25, 1987 [JP] Japan .................. 62-72090

[51] Int. Cl.$^4$ .............................. B01D 53/06
[52] U.S. Cl. .......................... 55/60; 55/78; 55/181; 55/390
[58] Field of Search ............... 55/34, 59, 60, 62, 77, 55/78, 181, 390

[56] References Cited

U.S. PATENT DOCUMENTS

| 2,114,810 | 4/1938 | Ray .................... 55/62 X |
| 2,993,563 | 7/1961 | Munters et al. ........ 55/62 X |
| 3,176,446 | 4/1965 | Siggelin ............... 55/62 X |
| 3,455,089 | 7/1969 | Mattia ................. 55/62 |
| 3,844,737 | 10/1974 | Macriss et al. ....... 55/390 X |
| 4,012,206 | 3/1977 | Macriss et al. ....... 55/62 X |
| 4,259,092 | 3/1981 | Matsuo et al. ........ 55/78 |
| 4,409,006 | 10/1983 | Mattia ................ 55/60 X |
| 4,421,532 | 12/1983 | Sacchetti et al. ..... 55/59 X |
| 4,436,534 | 3/1984 | Seguy ................. 55/59 X |
| 4,440,549 | 4/1984 | Girard et al. ........ 55/59 |
| 4,516,988 | 5/1985 | Winter ................ 55/59 |
| 4,589,892 | 5/1986 | Leonard .............. 55/390 X |

Primary Examiner—Robert Spitzer
Attorney, Agent, or Firm—Wegner & Bretschneider

[57] ABSTRACT

A method is disclosed for adsorption treatment of a gas which involves moving an adsorbent through a zone to alternately carry out a gas treating step by passing a gas containing a predetermined material such as a harmful organic solvent to be treated through the adsorbent to adsorb the material onto the adsorbent and a regenerating step by passing a regenerating gas at a high temperature through the adsorbent to desorb the adsorbed material from the adsorbent, while feeding the regenerating gas containing the desorbed material to the adsorbent after the gas treating step but before the regenerating step to re-adsorb the material onto the adsorbent before it reaches the regenerating step.

3 Claims, 5 Drawing Sheets

METHOD FOR ADSORPTION TREATMENT OF GAS

FIELD OF THE INVENTION

The present invention relates to a method for adsorption treatment of a gas. More particularly, the present invention relates to a method for adsorption treatment of a gas which comprises adsorbing a certain material contained in a gas to be treated with an adsorption means composed of activated carbon and then desorbing the material from the adsorbent with a regenerating gas.

BACKGROUND OF THE INVENTION

In chemical factories and the like, gases which contain harmful organic solvents are generated and therefore they must be purified by removing such organic solvents therefrom. For this purification of gases, they are subjected to adsorption treatment and there has been employed a gas treating apparatus having an adsorption means which contains activated carbon as an adsorbent. The adsorption means of the gas treating apparatus is, for example, a paper sheet containing activated carbon which is formed into a honeycomb structure, and adsorption treatment of a harmful organic solvent is carried out by passing a gas containing the organic solvent through the adsorption means of the gas treating apparatus to adsorb the harmful organic solvent with activated carbon to obtain a purified gas, while passing a regenerating gas at a high temperature such as at about 120° C. through the adsorption means onto which the organic solvent has been adsorbed to desorb the adsorbed organic solvent from the adsorbent. In such a gas treating apparatus, since adsorbability of activated carbon can be recovered by desorbing an organic solvent from it, a gas containing such an organic solvent is continuously treated by alternately repeating the adsorption step for adsorbing the organic solvent and the regenerating step for desorbing the organic solvent from the adsorbent to regenerate activated carbon.

In the gas treating apparatus using a honeycomb-structured paper sheet as the adsorption means, the means is provided rotatably, and the zone in which the adsorption means rotates is divided into two parts, that is, one part through which a gas containing an organic solvent to be treated is passed and the other part through which a high temperature regenerating gas is passed. By rotating the adsorption means, the means travels by turns through one part wherein the organic solvent containing gas is passed and the other part wherein the regenerating gas is passed during the rotation and, thereby, the organic solvent is adsorbed onto the adsorption means and then desorbed from it.

In the regenerating step of the adsorption means, a regenerating gas such as air, nitrogen gas or the like at about 120° C. is passed through the adsorption means which has adsorbed an organic solvent thereon to desorb the solvent from the adsorbent. For example, in the case where the desorbed solvent is recovered, the organic solvent is transferred together with the regenerating gas to a condenser to recover it by condensation. Upon condensing and recovering the solvent by using the condenser, it is necessary to lower the temperature of the regenerating gas. However, when the amount of the regenerating gas is large, for example, a high load must be applied to a refrigeration machine of the condenser in order to lower the temperature of the regenerating gas. Further, when the concentration of the organic solvent in the regenerating gas which is fed to the condenser is low, the load to be applied to the refrigeration machine of the condenser is large, whereas the amount of the organic solvent recovered is small, which impairs workability, economy and the like.

In addition, in the case where the desorbed organic solvent in the regenerating step is not recovered, it is treated, for example, with a catalytic incinerator. However, in this case, since the concentration of the organic solvent is low, a larger-sized incinerator is required and it is uneconomic. Further, in the case of an oxygen enriching apparatus wherein air is treated by adsorption as described above using an adsorption means of a honeycomb-structured sheet containing molecular-sieving-carbon as an adsorbent and then concentrated oxygen is taken out in the regenerating step, there is a problem that the concentration of oxygen can not be sufficiently increased in a conventional method.

OBJECTS OF THE INVENTION

The main object of the present invention is to provide methods for adsorption treatment of a gas wherein a certain material contained in the gas to be treated is adsorbed by an adsorption means and then the material is desorbed in a high concentration by a regenerating gas to solve problems in a conventional method.

This object as well as other objects and advantages of the present invention will become apparent to those skilled in the art from the following description with reference to the accompanying drawings.

SUMMARY OF THE INVENTION

According to the present invention, there is provided a method for adsorption treatment of a gas which comprises:

alternately carrying out a gas treating step by passing a gas containing a certain predetermined material to be treated through an adsorption means to adsorb the material onto said adsorption means, and a regenerating step by passing a regenerating gas at a high temperature through said adsorption means to desorb the adsorbed material from said adsorption means; and subjecting a gas containing the material desorbed from said adsorption means to a re-adsorbing step;

said re-adsorbing step being carried out by feeding said gas containing the desorbed material to said adsorption means after said gas treating step but before said regenerating step to adsorb the material onto said adsorption means before said regenerating step.

DETAILED DESCRIPTION OF THE INVENTION

Figure 1:
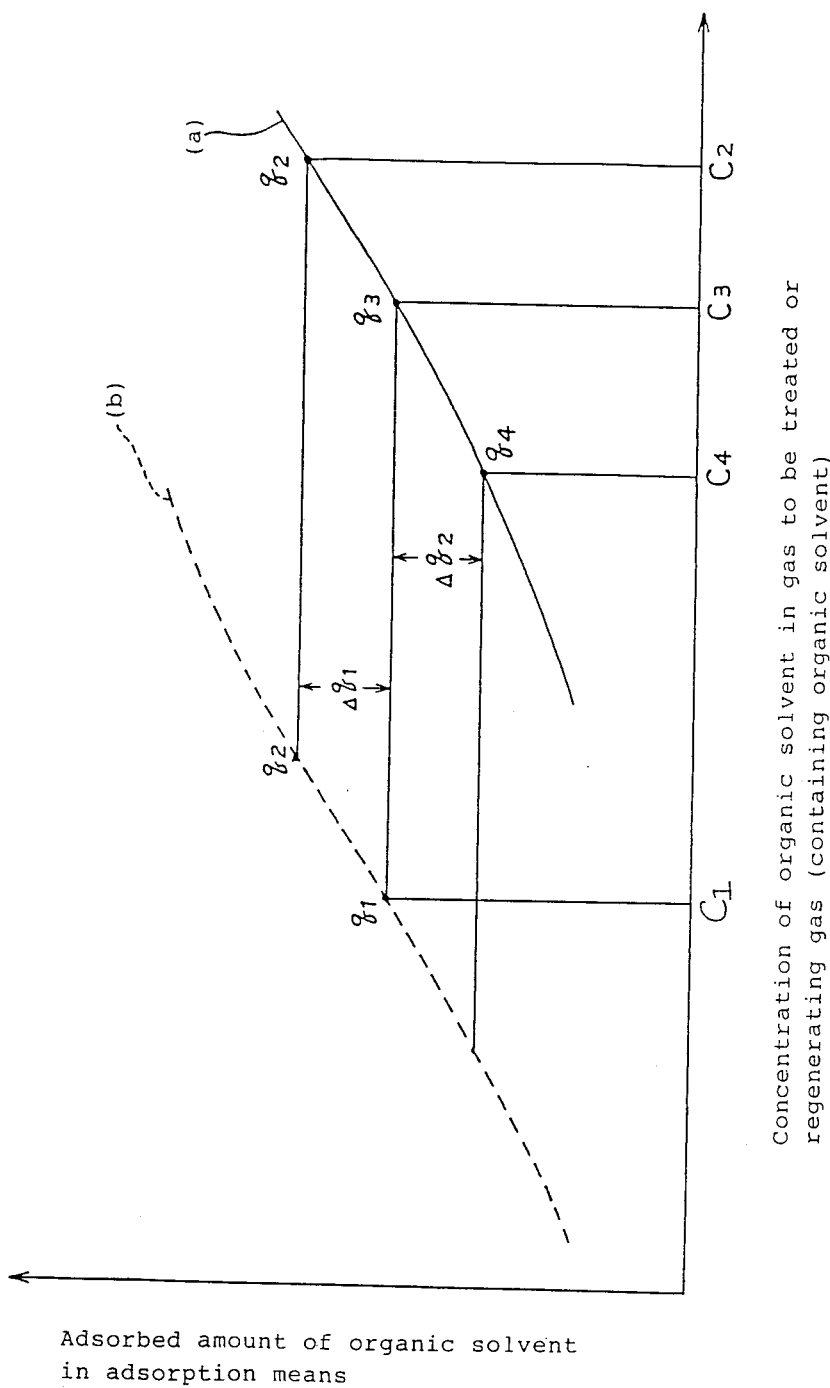
FIG. 1 is a schematic graph illustrating the principle of the method of the present invention.

The principle of the method of the present invention is illustrated by using the accompanying FIG. 1.

FIG. 1. is a graph schematically illustrating the relation between the amount of an organic solvent adsorbed in an adsorption means made of a paper sheet containing activated carbon and the concentration of the organic solvent in a gas to be treated or a regenerating gas which has passed through the adsorption means. The solid line (a) represents the relation between the amount of the organic solvent adsorbed in the adsorption means and the concentration of the regenerating gas containing the desorbed organic solvent. As the amount of the adsorbed organic solvent in the adsorption means increases, the regenerating gas at a high temperature such as at about 120° C. can desorb more organic solvent from the adsorption means to increase the concentration of the organic solvent in the regenerating gas which has passed through the adsorption means. The broken line (b) represents the relation between the concentration of the organic solvent contained in the gas to be treated at room temperature and the amount of the organic solvent adsorbed onto the adsorption means. As the concentration of the organic solvent in the gas to be treated increases, the amount of the organic solvent adsorbed onto the adsorption means also increases.

That is, it has been found that, when a gas containing an organic solvent is subjected to adsorption treatment, the ratio of the amount of the organic solvent desorbed from an adsorption means relative to the amount of the regenerating gas can be increased by further adsorbing the organic solvent in a higher concentration onto the adsorption means to increase the concentration of the organic solvent adsorbed onto the adsorption means before desorption of the adsorbed organic solvent from the adsorption means.

The method of the present invention is further illustrated in detail by the following preferred embodiments wherein an organic solvent (e.g., organic chlorinated solvent, organic fluorinated solvent, alcohol, either, ketone, ester; aromatic hydrocarbon or a mixture thereof) in a gas (e.g., air, nitrogen or a mixture thereof) to be treated is subjected to adsorption treatment with activated carbon.

Figure 2:
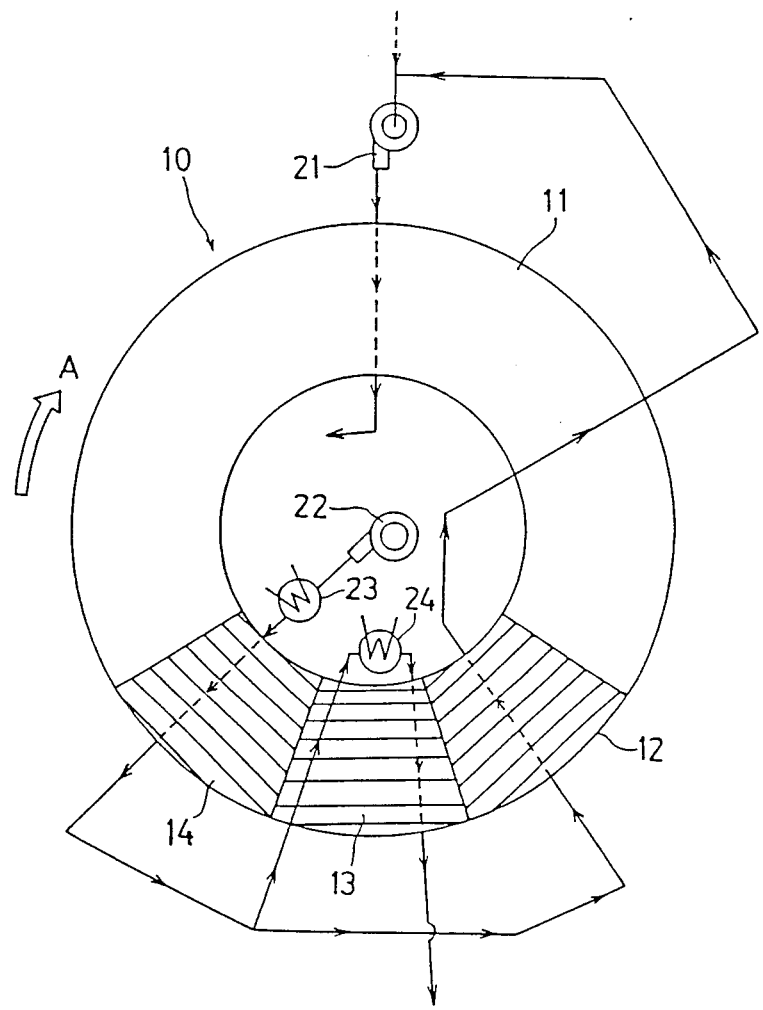
FIG. 2 is a schematic view of one embodiment of the apparatus used in the method of the present invention.

The method of the present invention can be carried out by using, for example, the apparatus as shown in FIG. 2. In this embodiment, the regenerating step is divided into two steps. The apparatus has a cylindrical adsorption means 10 which rotates intermittently or continuously toward the direction shown by the arrow A. Activated carbon is used as the adsorbent in the adsorption means 10. The adsorption means 10 is divided into a gas treating zone 11 in which the gas containing the organic solvent is passed through the adsorption means 10 to adsorb the organic solvent onto the adsorption means 10, the re-adsorbing zone 12 positioned at the downstream of the gas treating zone 11 with respect to the rotation direction of the adsorption means 10, a first regenerating zone 13 of the adsorption means positioned downstream of the re-adsorbing zone 12 with respect to the rotation direction of the adsorption means 10, and a second regenerating zone 14 of the adsorption means 10 positioned downstream of the first regenerating zone 13 with respect to the rotation direction of the adsorption means 10.

The gas treating zone 11 occupies, for example, about three-fourths of the rotating zone of the adsorption means 10, and the other zones 12 to 14 occupy the rest and each zone has an almost equal area, respectively.

The gas containing the organic solvent to be treated is fed into the gas treating zone 11 by, for example, a fan 21. The gas is passed through the adsorption means 10 in the gas treating zone 11, the organic solvents in the gas are adsorbed onto the adsorbent in the adsorption means 10 during passing through the adsorption means 10, and only the purified gas (e.g. clean air) flows out of the adsorption means 10. The purified gas is led to the predetermined position.

A regenerating gas (e.g., fresh air, nitrogen gas, or a mixture thereof containing no organic solvent), for example, fresh air containing no organic solvent is fed to a heater 23 by a fan 22 to heat to a high temperature such as about 120° C. and led to the second regenerating zone 14. The regenerating gas is passed through the adsorption means 10 in the second regenerating zone 14 to desorb the organic solvent from the adsorbent in the adsorption means 10 in which the organic solvent has been adsorbed. And the regenerating gas together with the desorbed organic solvent is discharged from the adsorption means 10. The concentration of the organic solvent is adjusted by the amount of the regenerating gas fed by the fan 22 and the amount of the regenerating gas led into the first regenerating zone so that the concentration of the organic solvent in the discharged regenerating gas is higher than that in the gas to be treated. A part of the discharged regenerating gas passed through the second regenerating zone 14 and containing the organic solvent is cooled to about room temperature and then is led into the re-adsorbing zone 12. The rest of the discharged regenerating gas containing the organic solvent is heated to, for example, about 120° C. by a heater 24 and then is led into the first regenerating zone 13.

The above regenerating gas containing the organic solvent led into the re-adsorbing zone 12 is passed through the adsorption means 10 in the zone 12. Since this regenerating gas contains the organic solvent in a higher concentration than that of the gas to be treated, the organic solvent in the regenerating gas is adsorbed onto the adsorbent in the adsorption means 10 during passage through the means 10. The purified gas is discharged from the adsorption means 10 of the re-adsorbing zone 12. The purified gas thus discharged from the adsorption means 10 is fed together with the gas containing the organic solvent to be treated into the gas treating zone 11 by the fan 21.

On the other hand, the regenerating gas heated to the high temperature and led into the first regenerating zone 13 is passed through the adsorption means 10 in the zone 13 to desorb the organic solvent from the adsorbent in the adsorption means 10 and then discharged from the adsorption means 10 together with the organic solvent.

When operating the apparatus in order to treat the gas, the adsorption means 10 travels successively through the gas treating zone 11, the re-adsorbing zone 12, the first regenerating zone 13 and the second regenerating zone 14 according to its rotation. And, the gas to be treated which contains the organic solvent in a concentration of $C_1$ is passed through the adsorption means 10 during traveling through the gas treating zone 11 to adsorb the organic solvent in the gas to be treated onto the adsorbent in the adsorption means 10. At this time, the amount of the organic solvent adsorbed onto the adsorption means is represented by the symbol $q_1$ in FIG. 1.

Then, the adsorption means 10 which has adsorbed the organic solvent moves toward the re-adsorbing zone 12, and a portion of the regenerating gas discharged from the adsorption means 10 in the second regenerating zone 14 and containing the organic solvent desorbed therefrom, which has been cooled to room temperature, is fed to the adsorption means 10 during traveling through the zone 12. When the discharged and cooled regenerating gas is passed through the adsorption means 10 in the zone 12, the adsorption means further adsorbs the organic solvent in the regenerating gas. At this time, the amount of the newly adsorbed organic solvent is represented by the symbol $\Delta q_1$ in FIG. 1, and the amount of the organic solvent in the adsorption means 10 is represented by the symbol $q_2$ in FIG. 1.

The adsorption means 10 which has adsorbed the organic solvent in the amount of $q_2$ during traveling through the gas treating zone 11 and the re-adsorbing zone 12 moves toward the first regenerating zone 13. And, a part of the high temperature regenerating gas containing the desorbed organic solvent which has passed though the adsorption means 10 in the second regenerating zone 14 is fed to the the adsorption means 10 during traveling through the first regenerating zone 13. And, by passing through the regenerating gas, the adsorption means 10 in the first regenerating zone 13 desorbs a part of the organic solvent which has been adsorbed in the gas treating zone 11 and the re-adsorbing zone 12. At this time, for simplifying, assuming that the amount of the organic solvent desorbed from the adsorption means 10 is equal to that of the organic solvent adsorbed in the re-adsorbing zone 12 ($\Delta q_1$) and the amount of the organic solvent in the adsorption means 10 becomes $q_3$, the concentration of the organic solvent in the regenerating gas which has passed through the adsorption means changes from $C_2$ to $C_3$ as seen from FIG. 1 and the average concentration is between $C_2$ and $C_3$.

The adsorption means 10 which has traveled through the first regenerating zone 13 is moved toward the second regenerating zone 14. And, the high temperature regenerating gas fed by the fan 22 is passed through the adsorption means 10 during traveling through the second regenerating zone 14. The organic solvent remaining in the adsorption means 10, after a part of the solvent has been desorbed in the first regenerating zone 13, is desorbed from the adsorption means by passing the regenerating gas through the means. A part of the regenerating gas which has passed through the second regenerating zone 14 is led into the readsorbing zone 12 together with the organic solvent desorbed in the zone and passed through the adsorption means 10 in the zone 12. The rest is led into the first regenerating zone 13 and passed through the adsorption means 10 in the zone 13.

At this time, assuming that the amount of the organic solvent in the adsorption means 10 becomes $q_4$ and the amount of the organic solvent desorbed in the second regenerating zone 14 becomes $\Delta q_2$, the concentration of the organic solvent in the regenerating gas which has passed through the second regenerating zone 14 drops from $C_3$ to $C_4$ and the average concentration is between $C_3$ and $C_4$. The value can be made greater than the concentration of the organic solvent in the gas to be treated by adjusting the amount of regenerating gas in the first and second regenerating zones.

To the contrary, in the case where, for example, $\Delta q_2$ of the organic solvent is desorbed from the adsorption means which has adsorbed $q_1(=q_3)$ of the organic solvent in the gas adsorbing step by the high temperature regenerating gas without using the method of the process of the present invention, the amount of the organic solvent in the adsorption means drops from $q_3$ to $q_4$ and the concentration of the organic solvent in the regenerating gas passed through the adsorption means is in the range of between $C_3$ and $C_4$ as seen from FIG. 1. Thus, the concentration of the organic solvent in the regenerating gas becomes much lower than that in the method of the present invention. Therefore, in the case where, for example, the organic solvent in the regenerating gas is burned in a catalytic incinerator, a larger-sized apparatus is required and it is uneconomical. And, in the case where the organic solvent is recovered, the regenerating gas must be led to a condenser so as to condense the organic solvent in the regenerating gas. In order to effect this, it is necessary to cool a larger amount of the regenerating gas to a lower temperature. Therefore, a larger-sized condenser is required and the amount of energy to be used is remarkably increased.

The method of the present invention is not limited to these embodiments. For example, the regenerating gas, which has been passed through the second regenerating zone 14 and has been led to the re-adsorbing zone 12 so that the organic solvent in the regenerating gas has been adsorbed during passing through the zone 12, may be recycled into the second regenerating zone 14 without mixing the regeneration gas with the gas to be treated which is fed to the gas treating zone 11. In this case, it is not necessary to feed fresh air as the regenerating gas. Further, instead of a part of the regenerating gas which has passed through the second regenerating zone 14 as in FIG. 2, fresh air which has been raised in temperature can be directly used as the regenerating gas to be passed through the first regenerating zone 13. Furthermore, a part of the regenerating gas which has passed through the first regenerating zone 13 can be recycled into the first regenerating zone 13 to promote desorption of the organic solvent in the first regenerating zone. Likewise, a part of the regenerating gas which has passed through the second regenerating zone 14 can be recycled into the second regenerating zone 14 to promote desorption of the organic solvent in the zone 14. In addition, the second regenerating zone 14 can be divided into plural zones in the circumferential direction and the zones can be connected in series to pass the regenerating gas through the respective zones. Or, the re-adsorbing region 12 can be divided into plural zones in the circumferential direction and said regions may be connected in series to pass the regenerating gas which has passed through the zone 14 through respective zones. In the case where the organic solvent is recovered, the regenerating gas containing the solvent which has passed through the first regenerating zone 13 can be recycled into the first regenerating zone 13 after the organic solvent has been condensed and recovered in the condenser.

Figure 3:
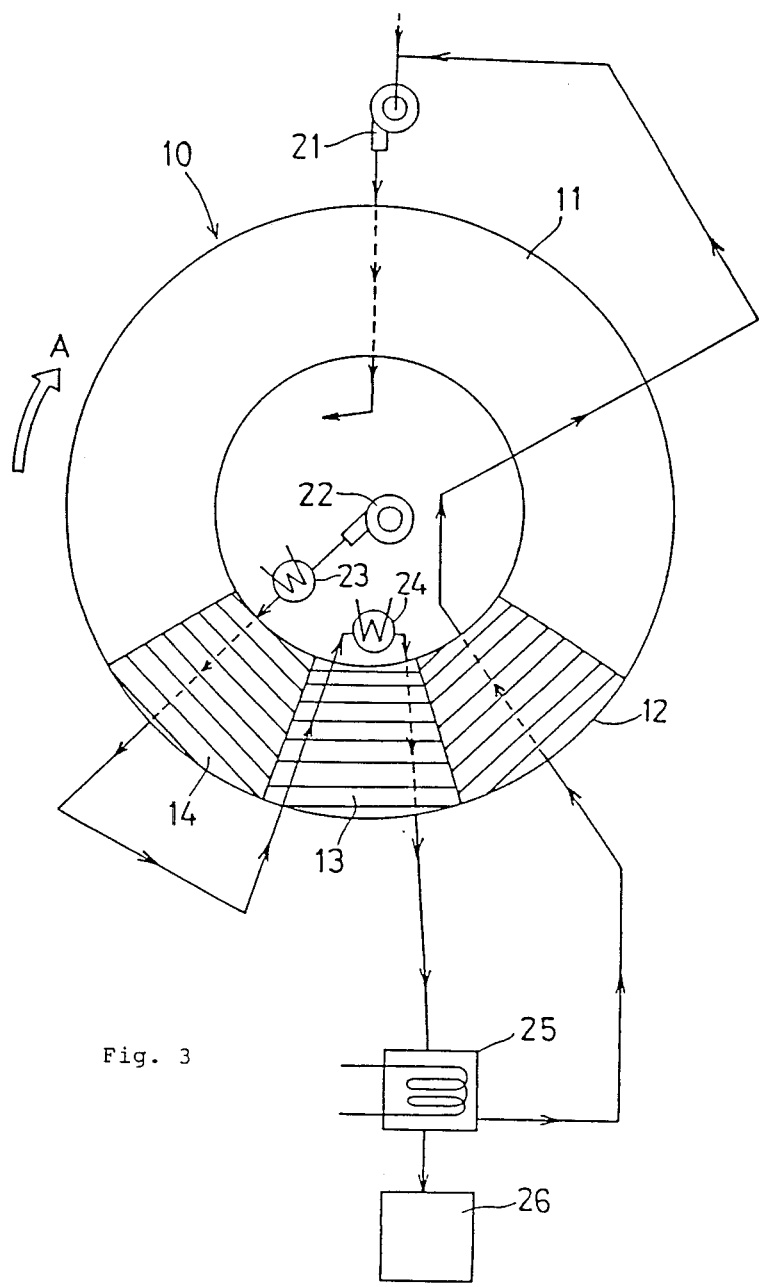
FIG. 3 is a schematic view of another embodiment of the apparatus used in the method of the present invention.

In the other embodiment as shown in FIG. 3, when the organic solvent to be treated is recovered, the entire regenerating gas which has passed through the second regenerating zone 14 can be heated by a heater 24 and then led to the first regenerating zone 13 to desorb the organic solvent in the zones 14 and 13. Then, the entire regenerating gas can be fed to the condenser 25 to condense and recover the organic solvent and, simultaneously, the gas which has passed through the condenser and contains unrecovered organic solvent can be led to the re-adsorbing zone 12. On the other hand, the recovered organic solvent is received in a recovery tank 26. In this embodiment, the gas which has passed through the re-adsorbing zone 12 is fed to the gas treating zone 11 and mixed with the gas to be treated.

Further, regardless of recovering the organic solvent, it is possible to provide a zone for cooling the adsorption means 10 between the second regenerating zone 14 and the gas treating zone 11. In such an arrangement, it is possible to make the concentration of the organic solvent in the discharged purified gas lower because the adsorption means 10 at a high temperature which has traveled through the second regenerating zone 14 is cooled and the means 10 can readily adsorb the organic solvent in the gas to be treated when the means is moved to the gas treating zone 11.

In the embodiment as shown in FIG. 3, the gas which has passed through the re-adsorbing zone 12 can be recycled into the second regenerating zone without mixing with the gas to be treated. In this case, it is not necessary to feed fresh air as the regenerating gas. In addition, a part of the regenerating gas containing the organic solvent which has passed through the first regenerating zone 13 can also be recycled into the zone 13 to increase the concentration of the organic solvent contained in the regenerating gas.

Figure 4:
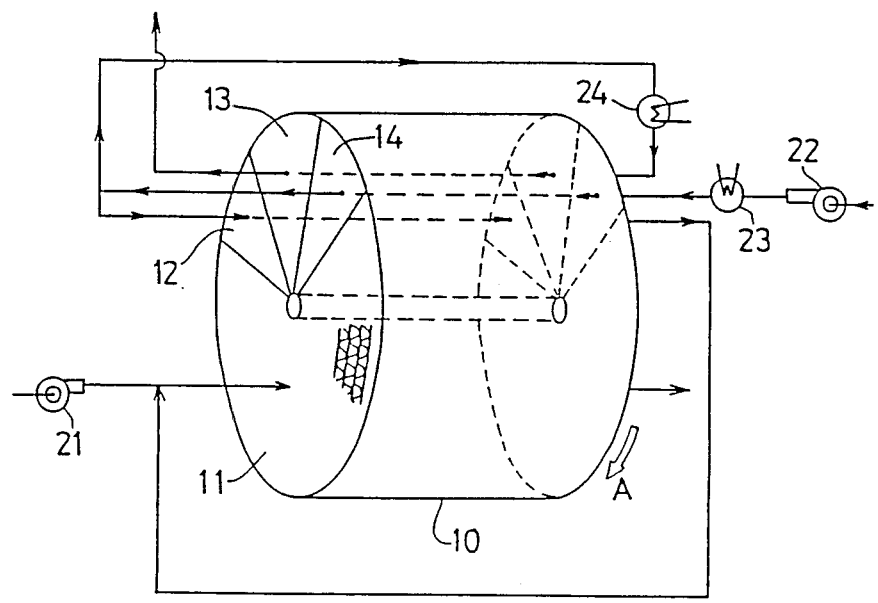
FIG. 4 is a perspective illustrating one embodiment of an adsorption means.

As the adsorption means 10 employed in the embodiments of FIGS. 2 and 3, there can be preferably used, for example, a disk type means as shown in FIG. 4 which is obtained by incorporating an adsorbent into paper, forming it into a honeycomb structure and winding it in the form of a cylinder. In FIG. 4, the gases such as the gas to be treated, the regenerating gas and the like are passed through the disk according to the same manner as described with respect to the embodiment of FIG. 2.

Figure 5:
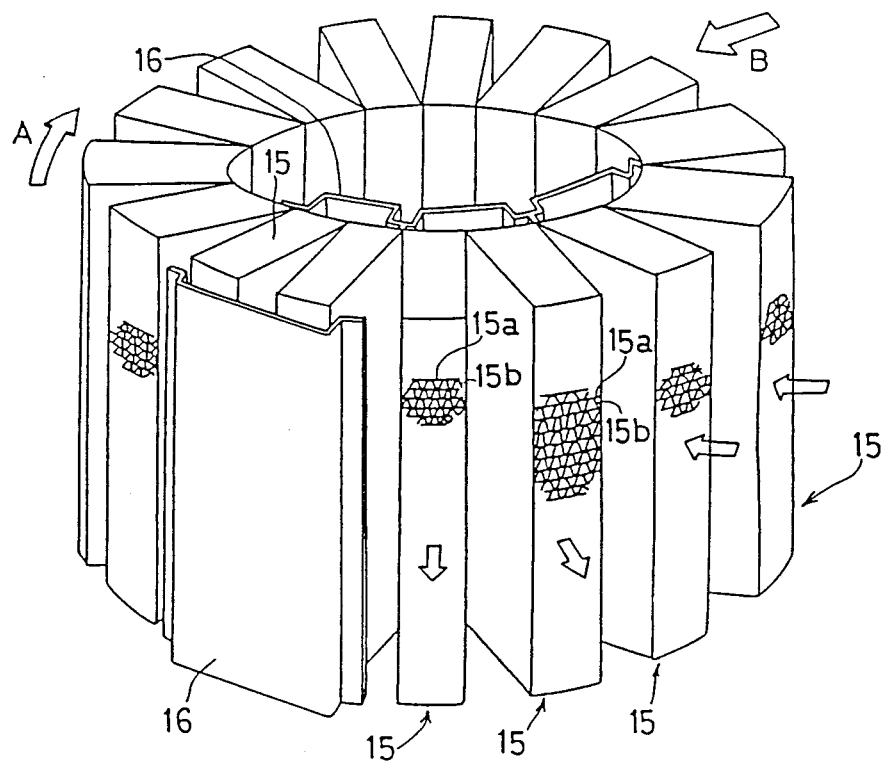
FIG. 5 is a perspective illustrating another embodiment of an adsorption means.
Figure 6:
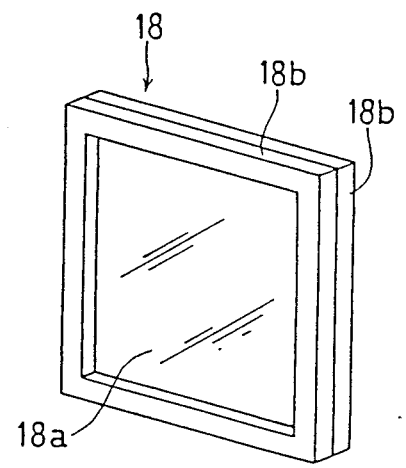
FIG. 6 is a perspective of an embodiment of an adsorption member used in an adsorption means.

As the adsorption means, there can be also used the means as shown in FIG. 5 composed of a plurality of rectangular honeycomb-structured members 15 arranged in a cylindrical structure, each of which is obtained by laminating plane paper sheets 15a and corrugated paper sheets 15b in plural stages. Respective paper sheets 15a and 15b can be obtained by, for example, making paper from powder or fibrous activated carbon and fibrillated synthetic pulp having flame retardancy and heat resistance, in the case where the organic solvent is subjected to adsorption treatment. Honeycomb-structured members 15 are arranged in a manner that ridges of corrugated paper sheets 15b are radially extended so that the gas can pass through toward the radial direction.

Such an adsorption means 10 is arranged so that it can rotate toward a circumferential direction as shown by the arrow A. As shown in FIG. 2, the rotation zone is divided into the gas treating zone 11, the re-adsorbing zone 12, the first regenerating zone 13 and the second regenerating zone 14. Ducts 16, 16 . . . are provided to both outside and inside circumferences of the means 10 so that the gas passes through only honeycomb-structured members 15 of a particular zone. The gas to be treated is fed from the direction as shown by the arrow B.

The adsorption means 10 is not limited to these embodiments. For example, an adsorption member 18 can be composed of an activated carbon sheet 18a obtained by processing activated carbon fibers into a felt which is held by a pair of frames 18b and 18b so that periphery thereof becomes airtight. The plural members 18 can be arranged so that activated carbon sheets 18a are crossed with respect to the radial direction at right angles to form the cylindrical adsorption means 10.

The adsorbent is not limited to activated carbon and can be appropriately selected according to a particular kind of the gas to be treated. For example, in the case of an oxygen enriching apparatus, molecular-sieving-carbon is preferred. Further, the regenerating gas is not limited to air. For example, in the case of combustible solvents, nitrogen gas is used.

As described hereinabove, in the method of the present invention, the adsorption means adsorbs a certain predetermined material in the gas to be treated during the gas treating step, and further adsorbs the same material desorbed in the regenerating step to increase the amount of the material adsorbed in the adsorption means and then the material adsorbed is desorbed in the regenerating step. Therefore, the concentration in the regenerating gas which has been passed through the adsorption means in the regenerating step becomes higher. Thus, for example, when the organic solvent in the regenerating gas is burned by using a catalytic incinerator in adsorption treatment of the organic solvent, a larger-sized incinerator is not required and it is economical. And, in the case of recovering the organic solvent, a temperature of the condenser can be raised higher to decrease the amount of energy required for recovering. Further, in the case of an oxygen enriching apparatus which increases the concentration of oxygen in air, oxygen in a high concentration can be obtained. Thereby, the present invention improves remarkably economic of an apparatus for adsorption treatment of a gas.

What is claimed is:

1. A method for adsorption treatment of a gas which comprises:

alternately carrying out a gas treating step by passing a gas containing a predetermined material to be treated through an adsorption means to adsorb the material onto said adsorption means, and a regenerating step by passing air as a regenerating gas at a high temperature through said adsorption means to desorb the adsorbed material from said adsorption means; and subjecting said regenerating gas containing the material desorbed from said adsorption means to a re-adsorbing step;

said re-adsorbing step being carried out be feeding said gas containing the desorbed material to said adsorption means after said gas treating step but before said regenerating step to adsorb the material onto said adsorption means before said regenerating step;

said gas treated in said re-adsorbing step being passed through the adsorption means during said gas treating step together with said gas to be treated.

2. A method according to claim 1, wherein the material is an organic solvent.

3. A method according to claim 1 wherein the adsorption means travels successively through zones for the gas treating step, the re-adsorbing step and the regenerating step, and a part or all of the gas containing the material desorbed from the regenerating step is recycled to the zone for the re-adsorbing step.

* * * * *